(12) United States Patent
Chen

(10) Patent No.: US 10,791,074 B2
(45) Date of Patent: Sep. 29, 2020

(54) INFORMATION PUSHING METHOD, APPARATUS, AND SYSTEM, AND COMPUTER STORAGE MEDIUM

(71) Applicant: TENCENT TECHNOLOGY (SHENZHEN) COMPANY LIMITED, Shenzhen (CN)

(72) Inventor: Kaibin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 201 days.

(21) Appl. No.: 15/959,811

(22) Filed: Apr. 23, 2018

(65) Prior Publication Data
US 2018/0248821 A1  Aug. 30, 2018

Related U.S. Application Data

(63) Continuation of application No. PCT/CN2017/083339, filed on May 5, 2017.

(30) Foreign Application Priority Data

May 6, 2016  (CN) .......................... 2016 1 0299024

(51) Int. Cl.
*H04L 12/58* (2006.01)
*G06F 3/0481* (2013.01)
(Continued)

(52) U.S. Cl.
CPC .......... *H04L 51/046* (2013.01); *G06F 3/0236* (2013.01); *G06F 3/04817* (2013.01);
(Continued)

(58) Field of Classification Search
CPC ......... H04L 67/26; H04L 51/04; H04L 51/10; H04L 51/14; H04L 65/4061; G06F 3/0236; G06F 3/04817; H04W 4/14
(Continued)

(56) References Cited

U.S. PATENT DOCUMENTS 8,996,639 B1 *  3/2015  Faaborg .................. H04L 51/02
455/412.1
2006/0015812 A1 *  1/2006  Cunningham ........ G06F 3/0219
715/263
(Continued)

FOREIGN PATENT DOCUMENTS

| CN | 103929354 A | 7/2014 |
|---|---|---|
| CN | 104756143 A | 7/2015 |

(Continued)

OTHER PUBLICATIONS

International Search Report dated Aug. 3, 2017 in International Patent Application No. PCT/CN2017/083339, filed May 5, 2017 (w/ English translation) [citing documents AA, AO-AU therein] 7 pp.
(Continued)

*Primary Examiner* — Abdullahi E Salad
(74) *Attorney, Agent, or Firm* — Oblon, McClelland, Maier & Neustadt, L.L.P.

(57) ABSTRACT

The present disclosure provides a method for information pushing. An instant message is received from a user. The instant message includes a user identifier of the user. A detection is made by circuitry of an information processing apparatus as to whether the instant message includes an image. Recommendation information is generated by the circuitry of the information processing apparatus according to the image and the user identifier based on a determination that the instant message includes the image. The recommendation information is pushed to a terminal corresponding to the user identifier. The user inputs a comment for the image
(Continued)

through the terminal according to the recommendation information.

15 Claims, 4 Drawing Sheets

(51) Int. Cl.
  *G06F 3/023* (2006.01)
  *H04L 29/08* (2006.01)
  *H04W 4/14* (2009.01)

(52) U.S. Cl.
  CPC .............. *H04L 51/04* (2013.01); *H04L 51/10* (2013.01); *H04L 67/26* (2013.01); *H04W 4/14* (2013.01)

(58) Field of Classification Search
  USPC .......................................................... 709/206
  See application file for complete search history.

(56) References Cited

U.S. PATENT DOCUMENTS

| | | | | |
|---|---|---|---|---|
| 2010/0179991 | A1* | 7/2010 | Lorch | H04M 1/7253 709/206 |
| 2013/0159919 | A1* | 6/2013 | Leydon | G06F 3/04817 715/780 |
| 2014/0156762 | A1* | 6/2014 | Yuen | H04L 51/32 709/206 |
| 2014/0214547 | A1* | 7/2014 | Signorelli | G06Q 30/0267 705/14.64 |
| 2014/0303964 | A1 | 10/2014 | Kennard et al. | |
| 2015/0067724 | A1* | 3/2015 | Johnson | H04N 21/4668 725/32 |
| 2015/0326708 | A1* | 11/2015 | Ginzburg | G06F 3/0484 715/752 |
| 2015/0365496 | A1* | 12/2015 | Matsumoto | H04L 51/04 709/217 |
| 2016/0004413 | A1* | 1/2016 | Leydon | G07F 17/3244 715/838 |
| 2016/0048298 | A1 | 2/2016 | Choi et al. | |
| 2016/0050169 | A1* | 2/2016 | Ben Atar | H04M 1/72544 709/206 |
| 2016/0191958 | A1* | 6/2016 | Nauseef | H04N 21/23418 725/116 |
| 2017/0011383 | A1* | 1/2017 | Melzer | G06Q 10/10 |
| 2017/0034092 | A1* | 2/2017 | Qin | H04L 51/12 |
| 2017/0083174 | A1* | 3/2017 | Tobens, III | G06F 3/0482 |
| 2017/0147185 | A1* | 5/2017 | Milvaney | G06F 3/04817 |
| 2017/0180276 | A1* | 6/2017 | Gershony | H04L 51/02 |
| 2017/0185581 | A1* | 6/2017 | Bojja | G06F 17/24 |
| 2017/0270551 | A1* | 9/2017 | Chen | H04L 51/32 |
| 2017/0279747 | A1* | 9/2017 | Melzer | G06Q 30/06 |
| 2017/0308290 | A1* | 10/2017 | Patel | G06F 3/04886 |
| 2018/0137097 | A1* | 5/2018 | Lim | H04L 51/10 |
| 2018/0255009 | A1* | 9/2018 | Chen | G06Q 50/01 |
| 2018/0331839 | A1* | 11/2018 | Gao | H04L 12/1813 |
| 2018/0373683 | A1* | 12/2018 | Hullette | G06Q 50/01 |
| 2019/0258850 | A1* | 8/2019 | Rihn | G06F 3/011 |

FOREIGN PATENT DOCUMENTS

| | | |
|---|---|---|
| CN | 104780093 A | 7/2015 |
| CN | 104965843 A | 10/2015 |
| CN | 105122285 A | 12/2015 |
| CN | 105337843 A | 2/2016 |
| CN | 105512516 A | 4/2016 |
| CN | 105763431 A | 7/2016 |
| JP | 2014010798 A | 1/2014 |

OTHER PUBLICATIONS

Chinese Office Action dated Apr. 25, 2018 in corr. Chinese Patent Application No. 201610299024.0, filed May 6, 2016 (w/ partial English translation) [citing documents AA, AO-AP therein] 7 pp.

* cited by examiner

INFORMATION PUSHING METHOD, APPARATUS, AND SYSTEM, AND COMPUTER STORAGE MEDIUM

RELATED APPLICATION

This application is a continuation of International Application No. PCT/CN2017/083339 filed on May 5, 2017 which claims priority to Chinese Patent Application No. 201610299024.0, entitled "INFORMATION PUSHING METHOD, APPARATUS, AND SYSTEM, AND COMPUTER STORAGE MEDIUM" filed on May 6, 2016. The entire disclosures of the prior applications are hereby incorporated by reference in their entirety.

FIELD OF THE TECHNOLOGY

The present disclosure relates to the field of mobile communication.

BACKGROUND OF THE DISCLOSURE

With the rapid development of Internet technologies and electronic technologies, mobile terminals have become an important tool for information exchanging among people.

Nowadays, to save call cost and short message service message cost, an increasing quantity of users prefer to log in to an instant messaging tool by using a network to chat with a friend. In a chat scenario, friends often send emoticons to each other for communication. Not only is such a communication manner capable of directly and vividly expressing a current emotion (for example, cry, smile, or anger) of the users, but also it can be used for spoof and kuso to enliven a chat atmosphere.

Generally, each user has his/her own favorable emoticons. An official channel or an artist channel is required if the user needs to comment on, for example, like or tip the emoticons used by him/her. Such a channel needs to be actively searched for by the user and has a relatively deep entrance, which is therefore not direct enough and results in a low commenting efficiency.

SUMMARY

An objective of the present disclosure is to provide a method, an apparatus and a non-transitory computer-readable storage medium for information pushing, so as to resolve the technical problem that a commenting channel provided in a related instant messaging system has a relatively deep entrance and the commenting efficiency is low.

In one embodiment, a method for information pushing is provided. An instant message is received from a user. The instant message includes a user identifier of the user. Detection is performed by circuitry of an information processing apparatus as to whether the instant message includes an image (e.g., an emoticon). Recommendation information is generated by the circuitry of the information processing apparatus according to the image and the user identifier based on a determination that the instant message includes the image. The recommendation information is pushed to a terminal corresponding to the user identifier. The user inputs a comment for the image through the terminal according to the recommendation information.

In another embodiment, an information pushing apparatus is disclosed. The apparatus include processing circuitry. The processing circuitry is configured to receive an instant message from a user, and the instant message includes a user identifier of the user. The processing circuitry is also configured to detect whether the instant message contains an image. Based on a determination that the instant message includes the image, the processing circuitry is configured to generate recommendation information according to the image and the user identifier, and push the recommendation information to a terminal corresponding to the user identifier. The user inputs a comment for the image through the terminal according to the recommendation information.

In another embodiment of the current disclosure, a non-transitory computer-readable storage medium is provided. The non-transitory computer-readable storage medium stores a program executable by a processor to receive an instant message from a user. The instant message includes a user identifier of the user. The program that is stored in the medium and executable by the processor further detects whether the instant message includes an image and generates recommendation information according to the image and the user identifier based on a determination that the instant message includes the image. The recommendation information is pushed to a terminal corresponding to the user identifier. The user inputs a comment for the image through the terminal according to the recommendation information.

According to the present disclosure, an instant messaging message (or an instant message) from a user is obtained (or received), and the instant messaging message (or instant message) carries (or includes) a user identifier of the user. When the instant messaging message carries (or includes) an image, recommendation information is generated according to the image and the user identifier and the recommendation information is pushed to a terminal corresponding to the user identifier. Subsequently, the user makes (or inputs) a comment for the image through the terminal according to the recommendation information. In this way, a commenting channel can be automatically pushed according to the behavior of sending an image by the user, which is therefore fast and direct and leads to a high commenting efficiency.

BRIEF DESCRIPTION OF THE DRAWINGS

The following describes specific implementations of the present disclosure in detail with reference to the accompanying drawings, to make the technical solutions and other beneficial effects of the present disclosure obvious.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure shall fall within the protection scope of the present disclosure.

An embodiment of the present disclosure provides an information pushing method, apparatus, and system.

Figure 1:
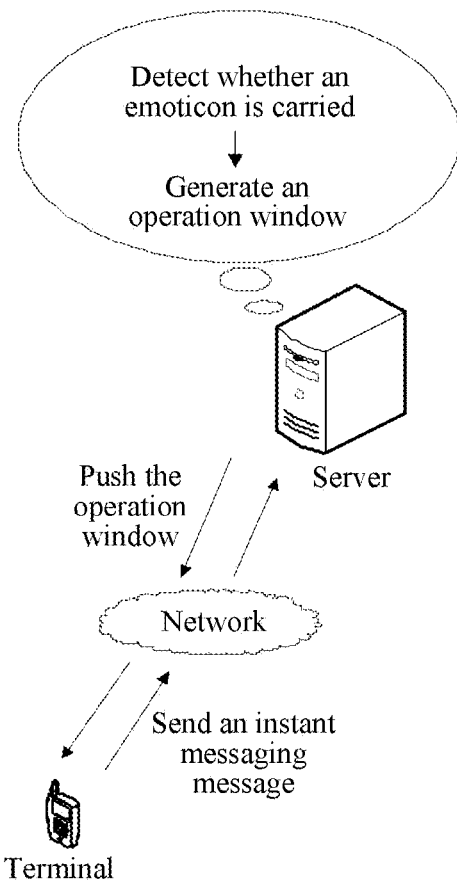
FIG. 1 is a schematic diagram of an application scenario of an information pushing system according to an embodiment of the present disclosure.

Referring to FIG. 1, FIG. 1 is a schematic diagram of an application scenario of an information pushing system according to an embodiment of the present disclosure. The information pushing system may include an information pushing apparatus applied to a server and mainly used for obtaining (or receiving) an instant messaging message sent by a user. The instant messaging message carries a user identifier of the user. Then, it is detected whether the instant messaging message carries an image (e.g., an emoticon or a picture derived from album documents). Recommendation information is generated according to the image and the user identifier if the instant messaging message carries an image; and the recommendation information is pushed to a terminal corresponding to the user identifier, so that the user makes a comment according to the recommendation information.

As shown in FIG. 1, the information pushing apparatus is integrated into a server. The terminal may be a network access device such as a notebook computer, a smartphone, or a tablet computer. The instant messaging message may include text, still images, dynamic images, voice and/or video, or the like. The user identifier may be an account registered by the user with an instant messaging system, or may be other information capable of identifying the user, such as a user name or a user mailbox, and is mainly used for distinguishing one user from another. The recommendation information may include text, a pattern, and/or a graphical interface, and may be specifically an operation interface (for example, an operation window) mainly for providing, to the user, an entrance for making a comment, such as making a positive/negative comment or performing tipping (for example, sending a red envelope). When the user logs in to an instant messaging system account on a mobile phone and sends an instant messaging message to a friend, the server detects whether the instant messaging message carries an image. If yes, an operation window is automatically generated according to the account and the image and the operation window is sent to the mobile phone, so that the user performs an operation such as makes a positive/negative comment or sends a red envelope on the operation window.

Detailed descriptions are provided below separately. It should be noted that, for ease of description, the following embodiments are numbered for a sequential description. It should be noted that the numbers of the embodiments are not intended to limit sequences of the embodiments.

Embodiment 1

This embodiment performs description from the respect of an information pushing apparatus. The information pushing apparatus may be specifically integrated into a device such as a server.

Figure 2:
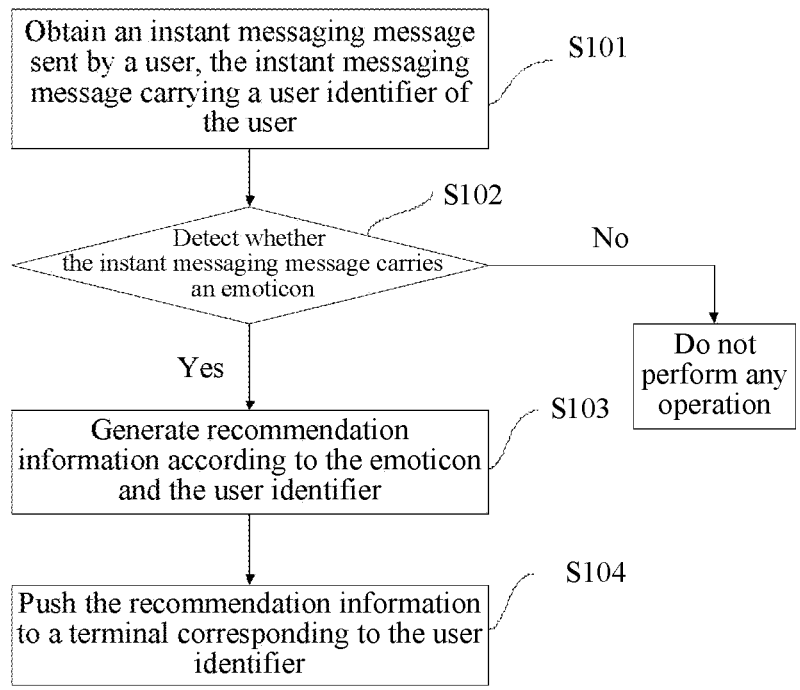
FIG. 2 is a schematic flowchart of an information pushing method according to an embodiment of the present disclosure.

Referring to FIG. 2, FIG. 2 describes the information pushing method provided in this embodiment of the present disclosure in detail. The method may include:

In step S101, an instant messaging message sent by a user is obtained. The instant messaging message includes a user identifier of the user.

In this embodiment, the instant messaging message may include text, still images, dynamic images, voice and/or video, or the like. The user identifier may be an account registered by the user with an instant messaging system, or may be other information capable of identifying the user, such as a user name or a user mailbox, and is mainly used for distinguishing one user from another.

It is noted that, in this embodiment of the present disclosure, in addition to various dedicated personal instant messaging and business instant messaging applications or platforms, the instant messaging system may be communication applications or platforms provided by various social platforms, such as a direct messaging tool on Weibo and communication tools on various shopping platforms.

In step S102, whether the instant messaging message carries an image is detected. If the detection result is yes, the following step S103 is performed. If the detection result is no, no operation is performed.

In this embodiment, the image (e.g., an emoticon) may be a still image, a dynamic image, or the like. When the instant messaging message does not carry an image, for example, when the instant messaging message is pure text information or voice information, the server may not perform any operation.

In step S103, recommendation information according to the image and the user identifier is generated.

In this embodiment, the recommendation information may include text, a pattern, and/or a graphical interface. The quantity and the content of each of the text, the pattern, and/or the graphical interface may be determined according to an actual application requirement. If the recommendation information is text or a pattern, the text or pattern may be associated to a corresponding commenting page. The commenting page is used for providing, to the user, an entrance for making a comment, such as making a positive/negative comment or performing tipping (for example, sending a red envelope). If the recommendation information is a graphical interface, for example, the operation interface (for example, an operation window) in this embodiment of the present disclosure, in addition to associating the operation interface to a corresponding commenting page, an entrance for making a comment, such as making a positive/negative comment or performing tipping (for example, sending a red envelope) may be provided to the user directly on the operation interface. The "associating" means that when the user selects (for example, clicks on or slides) the recommendation information, for example, the text, the pattern, and/or the graphical interface, a corresponding commenting page is directed to. For ease of description, in this embodiment of the present disclosure, description is performed by using an example in which the recommendation information is specifically a graphical interface, for example, an operation interface (for example, an operation window), and the operation interface is mainly used for providing, to the user, an entrance for making a comment, such as making a positive/negative comment or performing tipping (for example, sending a red envelope).

In an implementation of the present disclosure, the foregoing step S103 may specifically include:

In step (1-1), a search is performed for a corresponding preset image group according to the image.

In this embodiment, the preset image group mainly refers to a set of images belonging to a same type as the image, and usually includes a plurality of images designed by a same designer for a same theme. Certainly, the preset image group may include a plurality of images designed by different designers for different themes. The preset image group may be specifically determined according to an actual application requirement. During actual application, a parameter of a single image in the preset image group may be pre-associated by using Hash algorithm (Message-Digest Algorithm 5, MD5), so that it is convenient to search for a corresponding preset image group according to the parameter afterward.

In step (1-2), an accumulated quantity of sending times that the user has made to send one or more images belonging to the preset image group is obtained according to the user identifier.

In this embodiment, the accumulated quantity of sending times is a total quantity of times for which a same user sends one or more images belonging to the preset image group. It should be noted that, each time the server obtains an image sent by the user, the server searches for a corresponding preset image group, and adds one time to the accumulated quantity of sending times for which the preset image group is sent by the same user.

In step (1-3), the recommendation information according to the accumulated quantity of sending times is generated.

In an implementation of the present disclosure, the foregoing step (1-3) may specifically include:

determining whether the accumulated quantity of sending times meets a first preset condition; and if yes, generating the recommendation information; or if no, determining whether the accumulated quantity of sending times meets a second preset condition, and generating the recommendation information when the accumulated quantity of sending times meets the second preset condition.

In this embodiment, both the first preset condition and the second preset condition may be set according to an actual application requirement. For example, the first preset condition may be a first preset quantity of times exists in the accumulated quantity of sending times, and the first preset quantity of times is a quantity of times for which the user successively sends an image in the image group, that is, a quantity of times for which the user continuously sends an image in the image group. The second preset condition may be the accumulated quantity of sending times exceeds a second preset quantity of times. The second preset quantity of times is greater than the first preset quantity of times. In an implementation of the present disclosure, both the first preset quantity of times and the second preset quantity of times may be set according to an actual application requirement. For example, the first preset quantity of times may be 20 times, and the second preset quantity of times may be 80 times.

Certainly, the trigger condition needing to be met to generate the recommendation information is not limited to the foregoing first preset condition or second preset condition, but may alternatively be another condition. For example, when the accumulated quantity of sending times does not meet the second preset condition, it is determined whether a third preset condition is met. The third preset condition may be a third preset quantity of times exists in the accumulated quantity of sending times. The third preset quantity of times is a quantity of times for which the user sends one or more images belonging to the preset image group within a time period, and the like, and may be specifically determined according to an actual requirement.

In step S104, the recommendation information is pushed to a terminal corresponding to the user identifier, so that the user makes a comment according to the recommendation information.

In this embodiment, after the recommendation information is generated, the server pushes the recommendation information to the terminal in which the user identifier is located, so that the user makes a corresponding comment on the preset image group or the designer of the preset image group according to the recommendation information. The terminal may be a network access device such as a smartphone, a tablet computer, or a notebook computer.

In an implementation of the present disclosure, the recommendation information may be an operation interface. The operation interface may include a preset interface. In this case, after the operation interface is pushed to the terminal that corresponds to the user identifier, the information pushing method may further include:

In step (2-1), operation information of the user for the preset interface is received.

In this embodiment, the preset interface may be specifically in a form of text, pattern, or the like, and a location, shape and size of the preset interface on the operation interface may be determined according to a requirement.

Specifically, when the user performs an operation on (for example, single-clicks, double-clicks, or sound controls) the preset interface on the operation interface, the server receives corresponding operation information. For example, when the user clicks on a specified pattern on the operation interface, the server receives clicking information that corresponds to the specified pattern.

In step (2-2), a search is performed for a corresponding preset operation instruction according to the operation information.

In this embodiment, the preset operation instruction may be making a positive/negative comment on the preset image group, performing tipping (for example, sending a red envelope) or making a suggestion to the designer of the preset image group, stopping commenting, or the like. During actual application, the server needs to preset the preset operation instruction, and associate the preset operation instruction to the operation information and store the preset operation instruction in a database.

In step (2-3), the preset operation instruction is executed.

In an implementation of the present disclosure, when the preset operation instruction instructs to make a positive/negative comment, the foregoing step (2-3) may specifically include:

obtaining a total quantity of commenting times that corresponds to the preset operation instruction; and updating the total quantity of commenting times.

In this embodiment, the total quantity of commenting times may be a total quantity of positive/negative commenting times of the preset image group. The update method may be adding one time or two times to the total quantity of positive/negative commenting times each time, and the like. A specific update method may be determined according to an actual requirement.

It should be noted that, the total quantity of commenting times is mainly used for judging the popularity of the preset image group among users. By counting the total quantity of positive/negative commenting times of the preset image group, the designer may learn about the popularity of his/her work at any time. For example, the total quantity of positive/negative commenting times may be directly displayed in a background of the designer, or may be directly obtained by the designer at a frequency by using an information obtaining channel such as an official account. In this way, the designer is increasingly motivated to create on the platform, and is more devoted to creation of good images. Certainly, the total quantity of commenting times may be used as a judging criterion according to which a service provider of the instant messaging system distributes vested benefits to the designer. For example, a designer of a preset image group having a larger total quantity of positive commenting times is distributed with more vested benefits than a designer of a preset image group having a smaller total quantity of positive commenting times.

In an implementation of the present disclosure, when the preset operation instruction instructs to send a red envelope, the foregoing step (2-3) may specifically include:

searching for a corresponding preset associated interface according to the image, the preset associated interface including an interface for sending a red envelope; and pushing the preset associated interface to the terminal, so that the user sends a red envelope to the preset image group through the interface for sending a red envelope.

In this embodiment, the interface for sending a red envelope may be in a form of text or pattern, and may be directly associated to a balance account of the designer of the preset image group. The preset associated interface (or preset association interface) may further include another interface, such as a text box used for making a suggestion, or a link address used for viewing personal introduction or relevant work introduction of the designer of the preset image group. A specific quantity and content of the interface may be determined according to an actual requirement.

In addition, to prevent the user from commenting on a same preset image group or designer for a plurality of times within a short time period and causing troubles, after the preset operation instruction is executed, the information pushing method may further include:

resetting the accumulated quantity of sending times to zero, and restarting to count after preset duration (or time period).

In this embodiment, the preset duration (or time period) may be set according to an actual application requirement. For example, the preset duration may be set to 30 days, 15 days, or the like. After the user finishes commenting, it can be ensured that the operation interface is not generated due to triggering within the duration any more as long as the accumulated quantity of sending times that corresponds to the preset image group is maintained at zero within the preset duration, thereby avoiding causing a second time trouble to the user.

In an implementation of the present disclosure, when the preset operation instruction instructs to stop commenting, the foregoing step (2-3) may specifically include: closing the operation interface, and resetting the accumulated quantity of sending times to zero.

In this embodiment, when the preset operation instruction instructs to stop commenting, it indicates that the user does not want to comment on a same preset image group any more. In this case, the operation interface of the preset image group can be permanently prevented from being pushed to the terminal as long as the operation interface is closed and the accumulated quantity of sending times that corresponds to the preset image group is set to zero to stop counting It can be learned from the above that according to the information pushing method provided in this embodiment, an instant messaging message sent by a user is obtained, the instant messaging message carrying a user identifier of the user; it is detected whether the instant messaging message carries an image; recommendation information is generated according to the image and the user identifier if the instant messaging message carries an image; and the recommendation information is pushed to a terminal corresponding to the user identifier, so that the user makes a comment according to the recommendation information. In this way, a commenting channel can be automatically pushed according to the behavior of sending an image by the user, which is therefore fast and direct and leads to a high commenting efficiency.

Embodiment 2

According to the method described in Embodiment 1, the following further performs detailed descriptions by using an example.

In this embodiment, detailed description is performed by using an example in which the information pushing apparatus is integrated into a server, the terminal is a mobile phone, and the recommendation information is an operation interface. The server is a server having a function such as forwarding or processing an instant messaging message in an instant messaging system.

Figure 3:
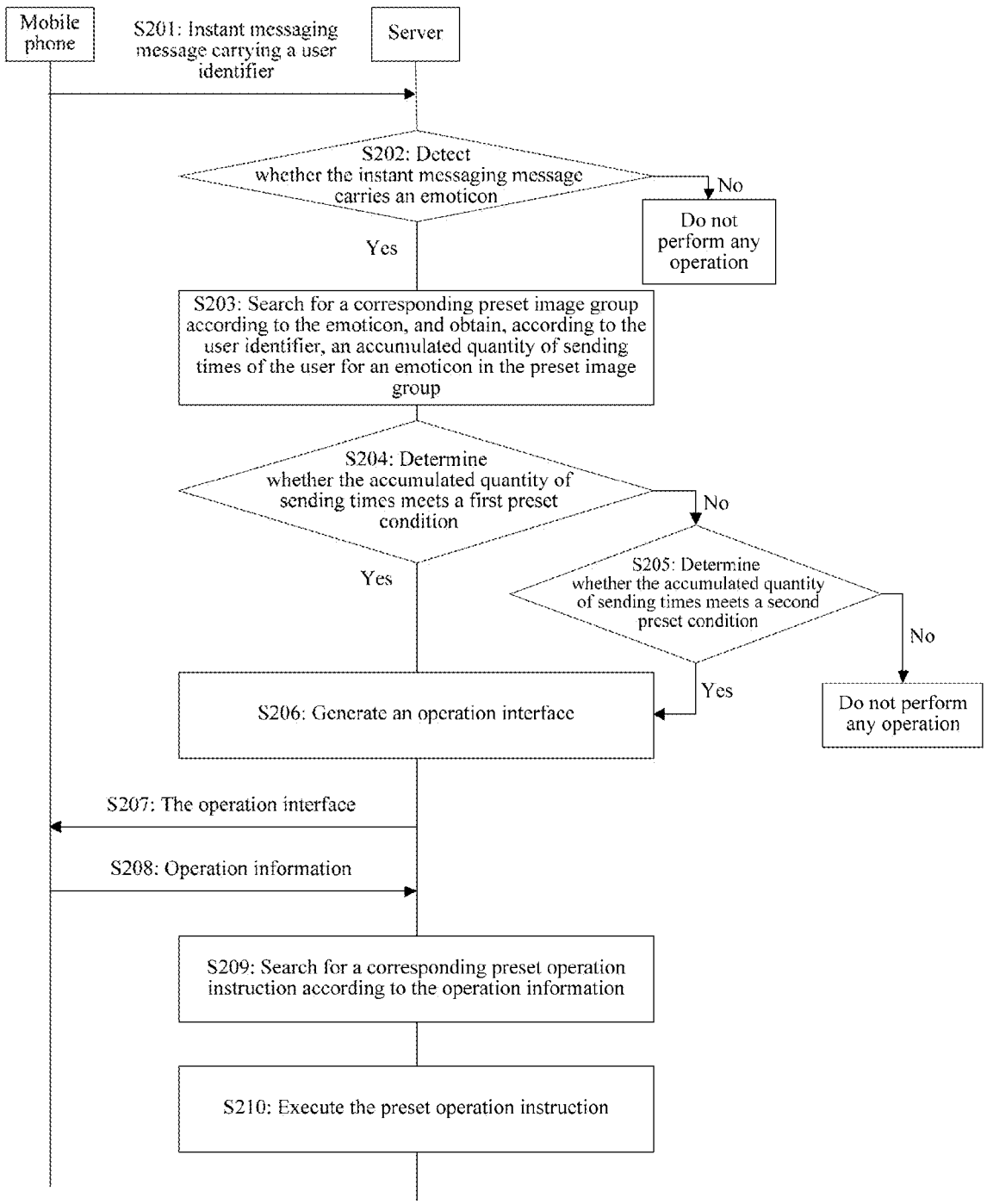
FIG. 3 is a sequence diagram of an information pushing method according to an embodiment of the present disclosure.

As shown in FIG. 3, a specific procedure of an operation interface pushing method may be as follows:

In step S201, the mobile phone generates an instant messaging message according to operation information input by a user, and sends the instant messaging message to the server by using a network. The instant messaging message carries a user identifier of the user.

For example, when the user inputs, on an editing interface of the instant messaging system, content needing to be sent, the mobile phone generates an instant messaging message of a corresponding format according to the content input by the user, and sends the message to the server by using a network. The instant messaging message carries a user account of the message sender. In this embodiment, the network may be a cellular network or wireless network.

In step S202, the server receives the instant messaging message, and detects whether the instant messaging message carries an image. If the detection result is yes, the server performs the following step S203. If the detection result is no, the server does not perform any operation.

For example, when the instant messaging message only includes text information or voice information, it can be determined that the instant messaging message does not carry an image. When the instant messaging message includes a still image or a dynamic image, it can be determined that the instant messaging message carries an image.

In step S203, the server searches for a corresponding preset image group according to the image, and obtains, according to the user identifier, an accumulated quantity of sending times that the user has made to send one or more images belonging to the preset image group.

For example, when a parameter of an image in the preset image group is pre-associated by using Hash algorithm, an associated preset image group may be searched for according to the parameter of a single image, and an accumulated quantity of sending times that the user has made to send one or more images belonging to the preset image group by using the user account may be obtained.

In step S204, whether the accumulated quantity of sending times meets a first preset condition is determined. If the determination result is yes, the server performs the following step S206. If the determination result is no, the server performs the following step S205.

For example, the first preset condition may be the user successively sends an image in the image group for 20 times. In this case, if the last 20 times in the accumulated quantity of sending times is the times for which the user successively sends an image in a same preset image group, it is determined that the accumulated quantity of sending times meets the first preset condition.

In step S205, whether the accumulated quantity of sending times meets a second preset condition is determined. The server performs the following step S206 when the accumulated quantity of sending times meets the second preset condition. The server may not perform any operation when the accumulated quantity of sending times does not meet the second preset condition.

For example, the second preset condition may be the accumulated quantity of sending times exceeds 80 times. In this case, if the accumulated quantity of sending times is 81 times, it is determined that the accumulated quantity of sending times meets the second preset condition.

In step S206, the server generates an operation interface.

For example, the operation interface may be an operation window. The operation window may include text and/or pattern. The quantity and the content of the text and/or pattern may be determined according to a requirement. The user may make a comment such as make a positive/negative comment or perform tipping (for example, send a red envelope) by clicking on or touching corresponding text or pattern on the operation window.

In step S207, the server pushes the operation interface to the mobile phone corresponding to the user identifier.

For example, the server may push, by using a network, the operation window to the mobile phone on which the user account is logged in to.

In step S208, the mobile phone receives and displays the operation interface. The operation interface may include a preset interface. The mobile phone receives the operation information of the user on the preset interface, and transfers the operation information to the server.

Figure 4:
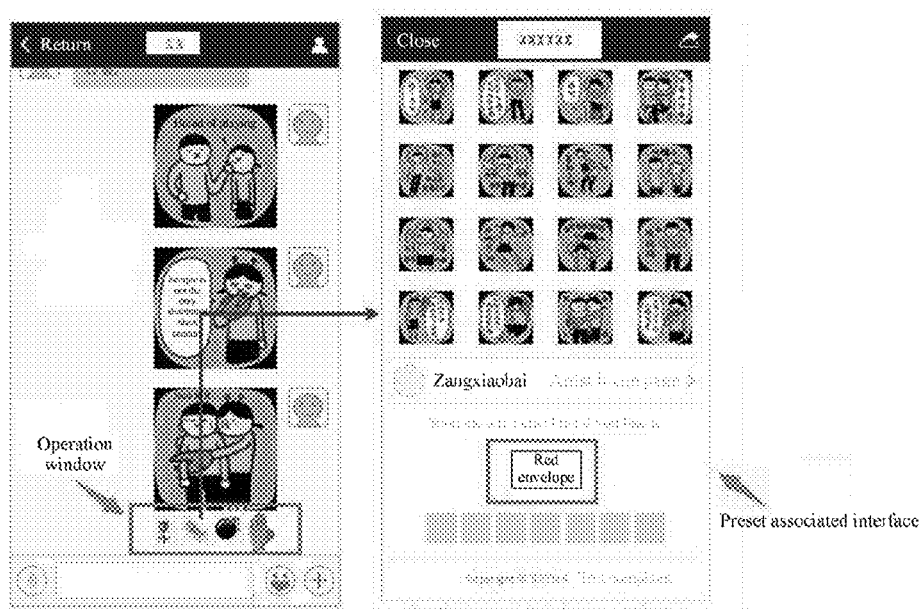
FIG. 4 is a schematic diagram of a pushing process of a preset associated interface (or a preset association interface) according to an embodiment of the present disclosure.

For example, as shown in FIG. 4, the operation interface displayed on the mobile phone may be an operation window. The operation window is located under an image sent last by the user on a chat interface. A preset interface on the operation window includes a flower pattern, a landmine pattern and a bank bill pattern. When the user single-clicks on the flower pattern, the landmine pattern or the bank bill pattern on the operation window, the mobile phone sends single-click information corresponding to the flower pattern, the landmine pattern or the bank bill pattern to the server by using a network.

In step S209, the server receives the operation information, and searches for a corresponding preset operation instruction according to the operation information.

For example, if the operation information received by the server is generated due to that the user clicks on the flower pattern on the operation window, the found preset operation instruction may instruct to make a positive comment on the preset image group; if the operation information received by the server is generated due to that the user clicks on the landmine pattern on the operation window, the found preset operation instruction may instruct to make a negative comment on the preset image group; if the operation information received by the server is generated due to that the user clicks on the bank bill pattern on the operation window, the found preset operation instruction may instruct to perform tipping on a designer of the preset image group, for example, send a red envelope; or if the operation information received by the server is generated due to that the user clicks on a gesture pattern on the operation window, the found preset operation instruction may instruct to stop commenting.

In step S210, the server executes the preset operation instruction.

In an implementation of the present disclosure, when the preset operation instruction instructs to make a positive/negative comment, the foregoing step S210 may specifically include:

obtaining, by the server, a total quantity of commenting times that corresponds to the preset operation instruction, and updating the total quantity of commenting times.

For example, when the user clicks on the flower pattern on the operation window, the server obtains a total quantity of positive commenting times of the preset image group, and adds one time to the total quantity of positive commenting times. When the user clicks on the landmine pattern on the operation window, the server obtains a total quantity of negative commenting times of the preset image group, and adds one time to the total quantity of negative commenting times.

In an implementation of the present disclosure, when the preset operation instruction instructs to send a red envelope, the foregoing step S210 may specifically include:

searching for, by the server, a corresponding preset associated interface according to the image, the preset associated interface including an interface for sending a red envelope; and pushing, by the server, the preset associated interface to the mobile phone, so that the user sends a red envelope to the preset image group through the interface for sending a red envelope.

For example, as shown in FIG. 4, when the user clicks on the bank bill pattern on the operation window, the server pushes a preset associated interface that corresponds to the image to the mobile phone. The preset associated interface includes a red envelope pattern for performing tipping. The user may click on the red envelope pattern to send a red envelope to the designer, and the amount of money in the sent red envelope may directly enter a balance account of the designer for spending.

In addition, to prevent the user from commenting on a same preset image group or designer for a plurality of times within a short time period and causing troubles, after the preset operation instruction is executed, the operation interface pushing method may further include:

resetting, by the server, the accumulated quantity of sending times to zero, and restarting to count after preset duration.

For example, the preset duration may be 30 days set by the system by default. After the user finishes making a corresponding comment on the preset image group or the designer, the server sets the accumulated quantity of sending times of the preset image group to zero, and stops counting for 30 days, thereby ensuring that the operation window is not generated due to triggering to the user in 30 days and avoiding causing a second time trouble.

In an implementation of the present disclosure, when the preset operation instruction instructs to stop commenting, the foregoing step S210 may specifically include: closing, by the server, the operation interface, and resetting the accumulated quantity of sending times to zero.

For example, when the user clicks on the gesture pattern on the operation window, it indicates that the user does not want to comment on a same preset image group any more. In this case, the server closes the operation window, and permanently maintains the accumulated quantity of sending times that corresponds to the preset image group at zero, thereby ensuring that the operation window is not generated due to triggering to the user any more.

It can be learned from the above that according to the operation interface pushing method provided in this embodiment, the mobile phone generates, according to operation information input by a user, an instant messaging message carrying a user identifier of the user, and sends the instant messaging message to a server by using a network. After receiving the instant messaging message, the server detects whether the instant messaging message carries an image. If yes, the server searches for a corresponding preset image group according to the image, and obtains, according to the user identifier, an accumulated quantity of sending times that the user has made to send one or more images belonging to the preset image group. Then, the server determines whether the accumulated quantity of sending times meets a first preset condition. If yes, the server generates an operation interface, and pushes the operation interface to the mobile phone that corresponds to the user identifier; or if no, the server determines whether the accumulated quantity of sending times meets a second preset condition. When the accumulated quantity of sending times meets the second preset condition, the server also generates an operation interface, and pushes the operation interface to the mobile phone that corresponds to the user identifier. Then, the mobile phone receives and displays the operation interface. The operation interface includes a preset interface. The mobile phone receives the operation information of the user on the preset interface, and transfers the operation information to the server. Then, the server receives the operation information, and searches for a corresponding preset operation instruction according to the operation information. Then, the server executes the preset operation instruction. By using the operation interface pushing method, a commenting channel can be automatically pushed according to the behavior of sending an image by the user, which is therefore fast and direct and leads to a high commenting efficiency.

Embodiment 3

Figure 5A:
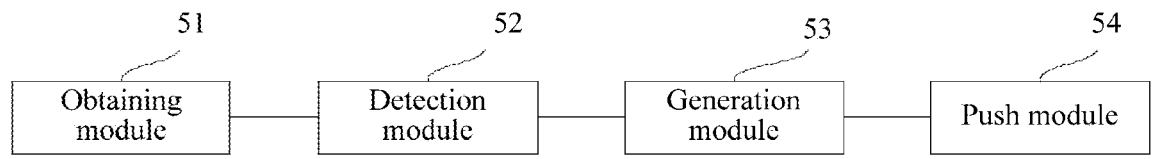
FIG. 5a is a schematic structural diagram of an information pushing apparatus according to an embodiment of the present disclosure.

Based on the method in Embodiment 1 and Embodiment 2, this embodiment performs further description from the respective of an information pushing apparatus. Referring to FIG. 5a, FIG. 5a describes, in detail, the information pushing apparatus provided in Embodiment 3 of the present disclosure. The information pushing apparatus includes: a memory, a processor, and one or more functional modules stored in the memory and capable of running on the processor. The functional modules in the memory includes: an obtaining module 51, a detection module 52, a generation module 53, and a push module 54.

(1) Obtaining Module 51

The obtaining module 51 is configured to obtain an instant messaging message sent by a user, the instant messaging message carrying a user identifier of the user.

In this embodiment, the instant messaging message may include text, still images, dynamic images, voice and/or video, or the like. The user identifier may be an account registered by the user with an instant messaging system, or may be other information capable of identifying the user, such as a user name or a user mailbox, and is mainly used for distinguishing one user from another.

It should be noted that, in this embodiment of the present disclosure, in addition to various dedicated personal instant messaging and business instant messaging applications or platforms, the instant messaging system may be communication applications or platforms provided by various social platforms, such as a direct messaging tool on Weibo and communication tools on various shopping platforms.

(2) Detection Module 52

The detection module 52 is configured to detect whether the instant messaging message carries an image.

In this embodiment, the image may be a still image, a dynamic image, or the like. When the detection module 52 detects that the instant messaging message only includes text information or voice information, it can be determined that the instant messaging message does not carry an image.

(3) Generation Module 53

The generation module 53 is configured to generate recommendation information according to the image and the user identifier if the instant messaging message carries an image.

In this embodiment, the recommendation information may include text, a pattern, and/or a graphical interface. The quantity and the content of each of the text, the pattern, and/or the graphical interface may be determined according to an actual application requirement. If the recommendation information is text or a pattern, the text or pattern may be associated to a corresponding commenting page. The commenting page is used for providing, to the user, an entrance for making a comment, such as making a positive/negative comment or performing tipping (for example, sending a red envelope). If the recommendation information is a graphical interface, for example, the operation interface (for example, an operation window) in this embodiment of the present disclosure, in addition to associating the operation interface to a corresponding commenting page, an entrance for making a comment, such as making a positive/negative comment or performing tipping (for example, sending a red envelope) may be provided to the user directly on the operation interface. The "associating" means that when the user selects (for example, clicks on or slides) the recommendation information, for example, the text, the pattern, and/or the graphical interface, a corresponding commenting page is directed to. For ease of description, in this embodiment of the present disclosure, description is performed by using an example in which the recommendation information is specifically a graphical interface, for example, an operation interface (for example, an operation window), and the operation interface is mainly used for providing, to the user, an entrance for making a comment, such as making a positive/negative comment or performing tipping (for example, sending a red envelope).

Figure 5B:
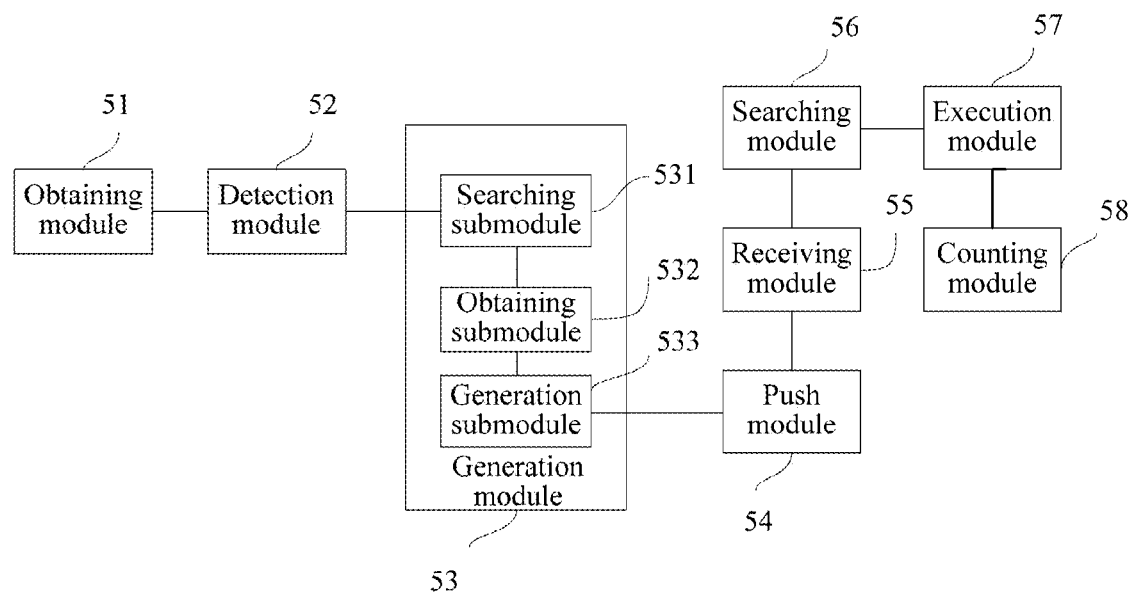
FIG. 5b is a schematic structural diagram of another information pushing apparatus according to an embodiment of the present disclosure.

In an implementation of the present disclosure, referring to FIG. 5b, the generation module 53 may specifically include the following submodules:

a searching submodule 531, configured to search for a corresponding preset image group according to the image.

In this embodiment, the preset image group mainly refers to a set of images belonging to a same type as the image, and usually includes a plurality of images designed by a same designer for a same theme. Certainly, the preset image group may include a plurality of images designed by different designers for different themes. The preset image group may be specifically determined according to an actual application requirement. During actual application, a parameter of a single image in the preset image group may be pre-associated by using Hash algorithm (Message-Digest Algorithm 5, MD5), so that it is convenient to search for a corresponding preset image group according to the parameter afterward.

an obtaining submodule 532, configured to obtain, according to the user identifier, an accumulated quantity of sending times that the user has made to send one or more images belonging to the preset image group.

In this embodiment, the accumulated quantity of sending times is a total quantity of times for which a same user sends an image in the preset image group. It should be noted that, each time the server obtains an image sent by the user, the server searches for a corresponding preset image group, and adds one time to the accumulated quantity of sending times for which the preset image group is sent by the same user.

a generation submodule 533, configured to generate the recommendation information according to the accumulated quantity of sending times.

In an implementation of the present disclosure, the generation submodule 533 may be specifically configured to:

determine whether the accumulated quantity of sending times meets a first preset condition; and if yes, generate the recommendation information; or if no, determine whether the accumulated quantity of sending times meets a second preset condition, and generate the recommendation information when the accumulated quantity of sending times meets the second preset condition.

In this embodiment, both the first preset condition and the second preset condition may be set according to an actual application requirement. For example, the first preset condition may be: A first preset quantity of times exists in the accumulated quantity of sending times, and the first preset quantity of times is a quantity of times for which the user successively sends an image in the image group. The second preset condition may be: The accumulated quantity of sending times exceeds a second preset quantity of times. The second preset quantity of times is greater than the first preset quantity of times. In an implementation of the present disclosure, both the first preset quantity of times and the second preset quantity of times may be set according to an actual application requirement. For example, the first preset quantity of times may be 20 times, and the second preset quantity of times may be 80 times.

Certainly, the trigger condition needing to be met to generate the recommendation information by the generation submodule 533 is not limited to the foregoing first preset condition or second preset condition, but may alternatively be another condition. For example, when the accumulated quantity of sending times does not meet the second preset condition, the generation submodule 533 determines whether a third preset condition is met. The third preset condition may be: A third preset quantity of times exists in the accumulated quantity of sending times. The third preset quantity of times is a quantity of times for which the user sends an image in the preset image group within a time period, and the like, and may be specifically determined according to an actual requirement.

(4) Push Module 54

The push module 54 is configured to push the recommendation information to a terminal corresponding to the user identifier, so that the user makes a comment according to the recommendation information.

In this embodiment, after the generation submodule 533 generates the recommendation information, the push module 54 pushes the recommendation information to the terminal in which the user identifier is located, so that the user makes a corresponding comment on the preset image group or the designer of the preset image group according to the recommendation information. The terminal may be a network access device such as a smartphone, a tablet computer, or a notebook computer.

In an implementation of the present disclosure, the recommendation information may be an operation interface. The operation interface may include a preset interface. The information pushing apparatus may further include: a receiving module 55, a searching module 56, and an execution module 57.

The receiving module 55 is configured to receive operation information of the user for the preset interface after the push module 54 pushes the operation interface to the terminal corresponding to the user identifier.

In this embodiment, the preset interface may be specifically in a form of text, pattern, or the like, and a location, shape and size of the preset interface on the operation interface may be determined according to a requirement.

Specifically, when the user performs an operation on (for example, single-clicks, double-clicks, or sound controls) the preset interface on the operation interface, the receiving module 55 receives corresponding operation information. For example, when the user clicks on a specified pattern on the operation interface, the receiving module 55 receives clicking information that corresponds to the specified pattern.

In this embodiment, the preset operation instruction may be making a positive/negative comment on the preset image group, performing tipping (for example, sending a red envelope) or making a suggestion to the designer of the preset image group, stopping commenting, or the like. During actual application, the server needs to preset the preset operation instruction, and associate the preset operation instruction to the operation information and store the preset operation instruction in a database.

The execution module 57 is configured to execute the preset operation instruction.

In an implementation of the present disclosure, when the preset operation instruction instructs to make a positive/negative comment, the execution module 57 may be specifically configured to:

obtain a total quantity of commenting times that corresponds to the preset operation instruction; and update the total quantity of commenting times.

In this embodiment, the total quantity of commenting times may be a total quantity of positive/negative commenting times of the preset image group. The update method may be adding one time or two times to the total quantity of positive/negative commenting times each time, and the like. A specific update method may be determined according to an actual requirement.

It should be noted that, the total quantity of commenting times is mainly used for judging the popularity of the preset image group among users. By counting the total quantity of positive/negative commenting times of the preset image group by the execution module 57, the designer may learn about the popularity of his/her work at any time. For example, the total quantity of positive/negative commenting times may be directly displayed in a background of the designer, or may be directly obtained by the designer at a frequency by using an information obtaining channel such as an official account. In this way, the designer is increasingly motivated to create on the platform, and is more devoted to creation of good images. Certainly, the total quantity of commenting times may be used as a judging criterion according to which a service provider of the instant messaging system distributes vested benefits to the designer. For example, a designer of a preset image group having a larger total quantity of positive commenting times is distributed with more vested benefits than a designer of a preset image group having a smaller total quantity of positive commenting times.

In an implementation of the present disclosure, when the preset operation instruction instructs to send a red envelope, the execution module 57 may be specifically configured to:

search for a corresponding preset associated interface according to the image, the preset associated interface including an interface for sending a red envelope; and push the preset associated interface to the terminal, so that the user sends a red envelope to the preset image group through the interface for sending a red envelope.

In this embodiment, the interface for sending a red envelope may be in a form of text or pattern, and may be directly associated to a balance account of the designer of the preset image group. The preset associated interface may further include another interface, such as a text box used for making a suggestion, or a link address used for viewing personal introduction or relevant work introduction of the designer of the preset image group. A specific quantity and content of the interface may be determined according to an actual requirement.

In this case, to prevent the user from commenting on a same preset image group or designer for a plurality of times within a short time period and causing troubles, the information pushing apparatus may further include a counting module 58, configured to:

after the execution module 57 executes the preset operation instruction, set the accumulated quantity of sending times to zero, and restart to count after preset duration.

In this embodiment, the preset duration may be set according to an actual application requirement. For example, the preset duration may be set to 30 days, 15 days, or the like. After the user finishes commenting, it can be ensured that the operation interface is not generated due to triggering within the duration any more as long as the counting module 58 maintains the accumulated quantity of sending times that corresponds to the preset image group at zero within the preset duration, thereby avoiding causing a second time trouble to the user.

In an implementation of the present disclosure, when the preset operation instruction instructs to stop commenting, the execution module 57 may be specifically configured to: close the operation interface, and set the accumulated quantity of sending times to zero.

In this embodiment, when the preset operation instruction instructs to stop commenting, it indicates that the user does not want to comment on a same preset image group any more. In this case, the operation interface of the preset image group can be permanently prevented from being pushed to the terminal as long as the execution module 57 closes the operation interface and sets the accumulated quantity of sending times that corresponds to the preset image group to zero to stop counting.

During specific implementation, the foregoing units may be implemented as independent entities, or may be combined arbitrarily to be implemented as a same entity or several entities. For specific implementation of the foregoing units, refer to the foregoing method embodiments. Details are not described herein again.

It can be learned from the above that according to the information pushing apparatus provided in this embodiment, the obtaining module 51 obtains an instant messaging message sent by a user, the instant messaging message carrying a user identifier of the user; the detection module 52 detects whether the instant messaging message carries an image; the generation module 53 generates recommendation information according to the image and the user identifier if the instant messaging message carries an image; and the push module 54 pushes the recommendation information to a terminal corresponding to the user identifier, so that the user makes a comment according to the recommendation information. By using this solution, a commenting channel can be automatically pushed according to the behavior of sending an image by the user. Therefore, compared with the related solution in which the user needs to actively searches for a commenting channel, this solution is fast and direct and is capable of greatly improving the commenting efficiency.

During actual application, the functions implemented by the units in the information pushing apparatus may be implemented by a central processing unit (CPU), a micro processor unit (MPU), a digital signal processor (DSP), a field programmable gate array (FPGA), and the like located in the information pushing apparatus.

Embodiment 4

This embodiment of the present disclosure further provides an information pushing system. The information pushing system may include any information pushing apparatus provided in the embodiments of the present disclosure. The information pushing apparatus may be integrated into a server. The server is a server having a function such as forwarding or processing an instant messaging message in an instant messaging system.

The server is configured to: obtain an instant messaging message sent by a user, the instant messaging message carrying a user identifier of the user; detect whether the instant messaging message carries an image; generate recommendation information according to the image and the user identifier if the instant messaging message carries an image; and push the recommendation information to a terminal corresponding to the user identifier, so that the user makes a comment according to the recommendation information.

In addition, the information pushing system may include another device, for example, may include a terminal.

The terminal is configured to: send an instant messaging message to the server, the instant messaging message carrying a user identifier of the user, and receive and display recommendation information pushed by the server, so that the user makes a commenting according to the recommendation information.

For specific implementations of the foregoing operations, refer to the foregoing embodiments, and details are not described herein again.

The information pushing system includes any information pushing apparatus provided in the embodiments of the present disclosure. Therefore, the information pushing system may implement the beneficial effects of any information pushing apparatus provided in the embodiments of the present disclosure. For details, refer to the foregoing embodiments, and details are not described herein again.

Embodiment 5

Figure 6:
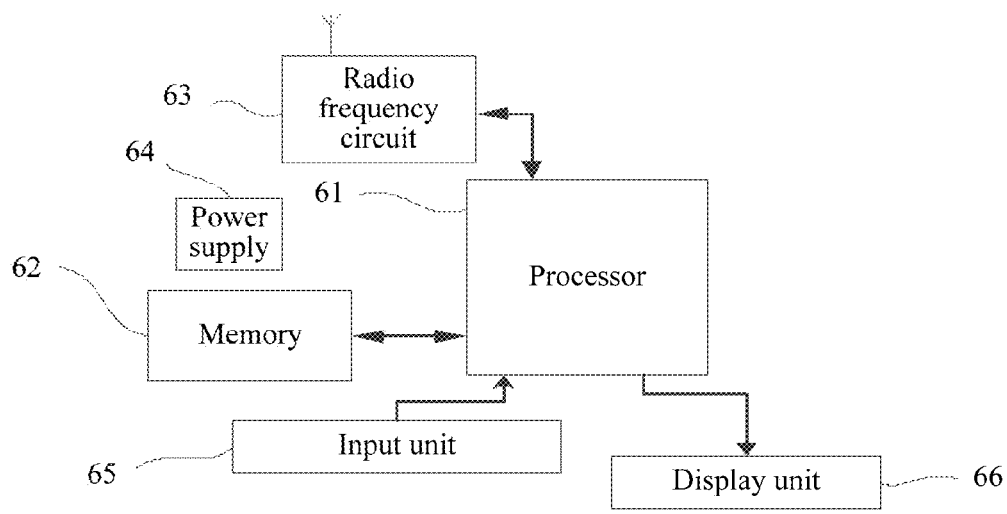
FIG. 6 is a schematic structural diagram of a server according to an embodiment of the present disclosure.

This embodiment of the present disclosure further provides a server. Any information pushing apparatus provided in the embodiments of the present disclosure may be integrated into the server. As shown in FIG. 6, FIG. 6 is a schematic structural diagram of the server in this embodiment of the present disclosure. Specifically:

The server may include components such as a processor 61 including one or more processing cores, a memory 62 including one or more computer readable storage media, a radio frequency (RF) circuit 63, a power supply 64, an input unit 65, and a display unit 66. A person skilled in the art may understand that the server structure shown in FIG. 6 does not constitute a limit to the server. The server may include more or fewer parts than those shown in the figure, may combine some parts, or may have different part arrangements.

The processor 61 is a control center of the server, and is connected to various parts of the entire server by using various interfaces and lines. By running or executing a software program and/or module stored in the memory 62, and invoking data stored in the memory 62, the processor 61 executes various functions of the server and performs data processing, thereby monitoring the entire server. Optionally, the processor 61 may include one or more processing cores. In an implementation of the present disclosure, the processor 61 may integrate an application processor and a modem processor, where the application processor mainly processes an operating system, a user interface, an application program, and the like, and the modem processor mainly processes wireless communication. It may be understood that the foregoing modem processor may alternatively not be integrated into the processor 61.

The memory 62 may be configured to store a software program and module. The processor 61 runs the software program and module stored in the memory 62, to implement various functional applications and data processing. The memory 62 may mainly include a program storage area and a data storage area. The program storage area may store an operating system, an application program required by at least one function (such as a sound playing function and an image display function), and the like. The data storage area may store data created according to use of the server, and the like. In addition, the memory 62 may include a high speed random access memory, and may further include a non-volatile memory, such as at least one magnetic disk storage device, a flash memory, or other volatile solid-state storage devices. Correspondingly, the memory 62 may further include a memory controller, to provide access of the processor 61 to the memory 62.

The RF circuit 63 may be configured to receive and send a signal during information transmission and receiving. Especially, the RF circuit 61 sends, after receiving downlink information of a base station, the information to one or more processors 61 for processing, and sends involved uplink data to the base station. Generally, the RF circuit 63 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 63 may also communicate with a network and another device by wireless communication. The wireless communication may use any communications standard or protocol, which includes but is not limited to, Global System for Mobile Communications (GSM), General Packet Radio Service (GPRS), Code Division A plurality of Access (CDMA), Wideband Code Division A plurality of Access (WCDMA), Long Term Evolution (LTE), e-mail, Short Message Service (SMS), and the like.

The server further includes the power supply 64 (for example, a battery) that supplies power to each component. In an implementation of the present disclosure, the power supply 64 may be logically connected to the processor 61 by using a power supply management system, so that functions such as management of charging, discharging, and power consumption are implemented by using the power supply management system. The power supply 64 may further include one or more of a direct current or alternating current power supply, a re-charging system, a power failure detection circuit, a power supply converter or inverter, a power supply state indicator, and any other components.

The server may further include the input unit 65. The input unit 65 may be configured to receive input numeric or character information and generate keyboard, mouse, joystick, optical, or trackball signal input related to user settings and function control. Specifically, in a specific embodiment, the input unit 65 may include a touch-sensitive surface and another input device. The touch-sensitive surface, which may also be referred to as a touchscreen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 61. Moreover, the touch controller can receive and execute a command sent from the processor 61. In addition, the touch-sensitive surface may be implemented in a plurality of types, such as a resistive type, a capacitive type, an infrared type, and a surface acoustic wave type. In addition to the touch-sensitive surface, the input unit 65 may further include another input device. Specifically, the another input device may include but is not limited to one or more of a physical keyboard, a function key (for example, a volume control key or a power on/off key), a trackball, a mouse, or a joystick.

The server may further include the display unit 66. The display unit 66 may be configured to display information input by the user or information provided to the user, and graphical user interfaces of the server. The graphical user interfaces each may include an image, text, an icon, a video, or any combination thereof. The display unit 66 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 61 to determine a type of a touch event, and then the processor 61 provides corresponding visual output on the display panel according to the type of the touch event. Although in FIG. 6, the touch-sensitive surface and the display panel are used as two separate parts to implement input and output functions, in some embodiments, the touch-sensitive surface and the display panel may be integrated to implement the input and output functions.

Although not shown, the server may further include a camera, a Bluetooth module, and the like. Details are not described herein again. Specifically, in this embodiment, the processor 61 of the server may load, according to the following instructions, executable files corresponding to processes of one or more application programs into the memory 62. The processor 61 runs the application programs stored in the memory 62, to implement various functions:

obtaining an instant messaging message sent by a user, the instant messaging message carrying a user identifier of the user; detecting whether the instant messaging message carries an image; generating recommendation information according to the image and the user identifier if the instant messaging message carries an image; and pushing the recommendation information to a terminal corresponding to the user identifier, so that the user makes a comment according to the recommendation information.

For specific implementations of the foregoing operations, refer to the foregoing embodiments, and details are not described herein again.

It can be learned from the above that according to the server provided in this embodiment, an instant messaging message sent by a user is obtained, the instant messaging message carrying a user identifier of the user; it is detected whether the instant messaging message carries an image; recommendation information is generated according to the image and the user identifier if the instant messaging message carries an image; and the recommendation information is pushed to a terminal corresponding to the user identifier, so that the user makes a comment according to the recommendation information. In this way, a commenting channel can be automatically pushed according to the behavior of sending an image by the user, which is therefore fast and direct and leads to a high commenting efficiency.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

Correspondingly, an embodiment of the present disclosure further provides a computer storage medium storing a computer program, and the computer program is used for performing the information pushing method in the embodiments of the present disclosure.

The information pushing method, apparatus, and system, and the computer storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification should not be construed as a limitation to the present disclosure.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for information pushing, the method comprising:
receiving an instant message from a user, the instant message including a user identifier of the user;
detecting, by circuitry of an information processing apparatus, whether the instant message includes an image;
generating, by the circuitry of the information processing apparatus, recommendation information according to the image and the user identifier based on a determination detection that the instant message includes the image, the recommendation information including at least a text, a pattern, and a graphic interface; and
pushing the recommendation information to a terminal corresponding to the user identifier;
wherein the generating the recommendation information according to the image and the user identifier comprises:
searching for a preset image group;
obtaining, according to the user identifier, an accumulated quantity of sending times the user has sent one or more images belonging to the preset image group; and
generating the recommendation information according to the accumulated quantity of sending times.

2. The method for information pushing according to claim 1, wherein the generating the recommendation information according to the accumulated quantity of sending times comprises:
generating the recommendation information when the accumulated quantity of sending times meets a first preset condition;
determining whether the accumulated quantity of sending times meets a second preset condition when the accumulated quantity of sending times does not meet the first preset condition; and
generating the recommendation information when the accumulated quantity of sending times meets the second preset condition.

3. The method for information pushing according to claim 1, wherein the recommendation information is an operation interface and the operation interface includes a preset interface.

4. The method for information pushing according to claim 3, after the operation interface is pushed to the terminal corresponding to the user identifier, further comprising:
receiving operation information from the user through the preset interface;
searching for a preset operation instruction corresponding to the operation information; and
executing the preset operation instruction.

5. The method for information pushing according to claim 4, wherein
when the preset operation instruction is to send a red envelope, the executing the preset operation instruction includes
searching for a preset association interface according to the image, the preset association interface having an interface for sending the red envelope; and
pushing the preset association interface to the terminal.

6. The method for information pushing according to claim 4, after the executing the preset operation instruction, further comprising:
resetting the accumulated quantity of sending times to zero, and
restarting accumulation of quantity of sending times after a preset time period.

7. An information pushing apparatus, comprising:
processing circuitry configured to:
receive an instant message from a user, the instant messaging message including a user identifier of the user;
detect whether the instant message includes an image;
generate recommendation information according to the image and the user identifier based on a determination detection that the instant message includes the image, the recommendation information including at least a text a pattern, and a graphic interface: and
push the recommendation information to a terminal corresponding to the user identifier wherein the user inputs a comment for the image through the terminal according to the recommendation information;

wherein the processing circuitry is configured to:
search for a preset image group associated with the image;
obtain, according to the user identifier, an accumulated quantity of sending times the user has sent one or more images belonging to the preset image group; and
generate the recommendation information according to the accumulated quantity of sending times.

8. The information pushing apparatus according to claim 7, wherein the processing circuitry is further configured to:
determine whether accumulated quantity of sending times meets a first preset condition;
generate the recommendation information when the accumulated quantity of sending times meets the first preset condition;
determine whether the accumulated quantity of sending times meets a second preset condition when the accumulated quantity of sending times does not meet the first preset condition, and
generate the recommendation information when the accumulated quantity of sending times meets the second preset condition.

9. The information pushing apparatus according to claim 7, wherein the recommendation information is an operation interface, and the operation interface includes a preset interface.

10. The information pushing apparatus according to claim 9, wherein after the operation interface is pushed to the terminal corresponding to the user identifier, the processing circuitry is configured to:
receive operation information from the user through the preset interface;
search for a preset operation instruction corresponding to the operation information; and
execute the preset operation instruction.

11. The information pushing apparatus according to claim 10, wherein
when the preset operation instruction is to send a red envelope, the processing circuitry is further configured to:
search for a preset association interface according to the image, the preset association interface having an interface for sending the red envelope; and
push the preset association interface to the terminal, and the user sends the red envelope to the preset image group through the interface for sending the red envelope.

12. The information pushing apparatus according to claim 10, the processing circuitry is further configured to:
after executing the preset operation instruction, reset the accumulated quantity of sending times to zero, and restart accumulation of quantity of sending times after a preset time period.

13. A non-transitory computer-readable storage medium storing a program executable by a processor to perform:
receiving an instant message from a user, the instant message including a user identifier of the user;
detecting whether the instant message includes an image;
generating recommendation information according to the image and the user identifier based on a determination detection that the instant message includes the image, the recommendation information including at least a text, a pattern, and a graphic interface: and pushing the recommendation information to a terminal corresponding to the user identifier, wherein the user inputs a comment for the image through the terminal according to the recommendation information;
wherein the generating the recommendation information according to the image and the user identifier comprises:
searching for a preset image group associated with the image;
obtaining, according to the user identifier, an accumulated quantity of sending times the user has sent one or more images belonging to the preset image group;
and generating the recommendation information according to the accumulated quantity of sending times.

14. The non-transitory computer-readable storage medium according to claim 13; wherein the generating the recommendation information according to the accumulated quantity of sending times comprises:
determining whether the accumulated quantity of sending times meets a first preset condition;
generating the recommendation information when the accumulated quantity of sending times meets the first preset condition;
determining whether the accumulated quantity of sending times meets a second preset condition when the accumulated quantity of sending times does not meet the first preset condition; and
generating the recommendation information when the accumulated quantity of sending times meets the second preset condition.

15. The non-transitory computer-readable storage medium according to claim 13, wherein the recommendation information is an operation interface and the operation interface includes a preset interface.

* * * * *